United States Patent
Zumberge et al.

(10) Patent No.: US 7,013,209 B2
(45) Date of Patent: Mar. 14, 2006

(54) OPERATING A MULTIMODE ABS

(75) Inventors: Jon T. Zumberge, Centerville, OH (US); Kenneth R. Buckholtz, St. Peters, MO (US); Hendrikus T. Smakman, Bavaria (DE)

(73) Assignees: Delphi Technologies, Inc., Troy, MI (US); Bayerische Motoren Werke Aktiengesellsha, (DE)

( * ) Notice: Subject to any disclaimer, the term of this patent is extended or adjusted under 35 U.S.C. 154(b) by 26 days.

(21) Appl. No.: 10/463,359

(22) Filed: Jun. 16, 2003

(65) Prior Publication Data

US 2004/0254711 A1   Dec. 16, 2004

(51) Int. Cl.
*B60T 7/12* (2006.01)

(52) U.S. Cl. .................... 701/76; 701/71; 701/34; 303/122.05; 303/122.06

(58) Field of Classification Search ................ 701/76, 701/69, 70, 71, 48, 78; 180/65.3; 303/122.06, 303/122.05, 122.04
See application file for complete search history.

(56) References Cited

U.S. PATENT DOCUMENTS

| | | | |
|---|---|---|---|
| 5,642,280 A * | 6/1997 | Negrin et al. .................... 701/1 |
| 5,752,751 A * | 5/1998 | Nakaura et al. ....... 303/122.06 |
| 5,795,039 A | 8/1998 | Fennel et al. |
| 5,868,473 A | 2/1999 | Kato et al. |
| 6,092,879 A * | 7/2000 | Kornhaas et al. ...... 303/122.04 |
| 6,231,133 B1 | 5/2001 | Tsukamoto |
| 6,249,736 B1 | 6/2001 | Schmidt et al. |
| 6,424,900 B1 | 7/2002 | Murray et al. |
| 6,517,171 B1 * | 2/2003 | Oshiro et al. ............ 303/113.5 |
| 2001/0041958 A1 * | 11/2001 | Oshiro et al. .................. 701/69 |
| 2002/0020575 A1 * | 2/2002 | DeLuca et al. ............. 180/275 |
| 2003/0014129 A1 | 1/2003 | Weiberie et al. |
| 2004/0162650 A1 * | 8/2004 | Kueperkoch .................. 701/29 |

FOREIGN PATENT DOCUMENTS

| | | |
|---|---|---|
| DE | 44 14 980 | 2/1995 |
| DE | 195 11 161 | 10/1998 |
| DE | 198 35 881 | 4/1999 |
| DE | 198 07 366 | 8/1999 |
| DE | 696 06 080 | 1/2000 |
| DE | 101 31 806 | 1/2003 |

* cited by examiner

Primary Examiner—Thomas G. Black
Assistant Examiner—Christine M. Behncke
(74) Attorney, Agent, or Firm—Michael D. Smith

(57) ABSTRACT

A vehicle anti-lock brake system determines when an ABS failure condition has occurred, configures a failure condition operating mode of the ABS control, and, finally, activates the ABS control based on the failure condition operational mode. When a brake actuator failure occurs, this allows the system to configure the failure condition operating mode to exclude the wheel having the failed brake actuator. Alternately, the system may configure the failure condition operating mode to exclude wheel speed data when an invalid wheel speed indicator is determined for a wheel.

7 Claims, 4 Drawing Sheets

OPERATING A MULTIMODE ABS

TECHNICAL FIELD OF THE INVENTION

The invention relates to vehicle brake systems, and more particularly to provisions for operating an anti-lock brake system.

BACKGROUND OF THE INVENTION

Many vehicles such as automobiles, trucks, buses, and motor homes are equipped with an anti-lock brake system (ABS). Advances in control-by-wire technology allow for the integration or distribution of vehicle systems such as a braking system. A distributed braking system provides individual braking control of each vehicle wheel. For background on control-by-wire systems, U.S. Pat. No. 6,424,900 to Murray et. al, and assigned to Delphi Technologies, Inc. of Troy Mich., discusses one control-by-wire implementation.

Generally, a brake-by-wire ABS is comprised of various sensors, a hydraulic system, brake actuators, and a controller unit that provides command and control for the anti-lock brake system. When sensors indicate that a vehicle is experiencing a potential brake lock-up event or a variable traction event, the ABS provides a controlled braking sequence. An anti-lock brake system generally relies on sensor data from each wheel in order to operate. However, a failure in a wheel speed indicator or a brake actuator will cause the anti-lock brake system to be completely disabled. The complete disabling of an anti-lock brake system may reduce the steering response characteristics of a vehicle, although the failure of an ABS sensor usually will not disable a steering system. The application of both ABS and steering is desirable under emergency braking conditions for enhanced vehicle performance. Therefore, it would be desirable to provide an improved method for operating an anti-lock brake system that overcomes these and other disadvantages.

SUMMARY OF THE INVENTION

In accordance with the invention, a method for operating a vehicle anti-lock brake system is disclosed. The method includes determining an ABS failure condition has occurred, configuring a failure condition operating mode of the anti-lock brake system and, finally, activating the anti-lock brake system based on the failure condition operational mode.

In accordance with another aspect of the invention, a computer readable medium storing a computer program for operating a vehicle anti-lock brake system is described. Computer readable code for determining an ABS failure condition has occurred, configuring a failure condition operating mode of the anti-lock brake system, and activating the anti-lock brake system based on the failure condition operational mode is described.

In accordance with yet another aspect of the invention, a vehicle including an anti-lock brake system and means for operating the anti-lock brake system when an ABS failure condition occurs are described. Operating the anti-lock brake system comprises determining an ABS failure condition has occurred, configuring a failure condition operating mode of the ABS, and activating the ABS based on the failure condition operational mode.

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
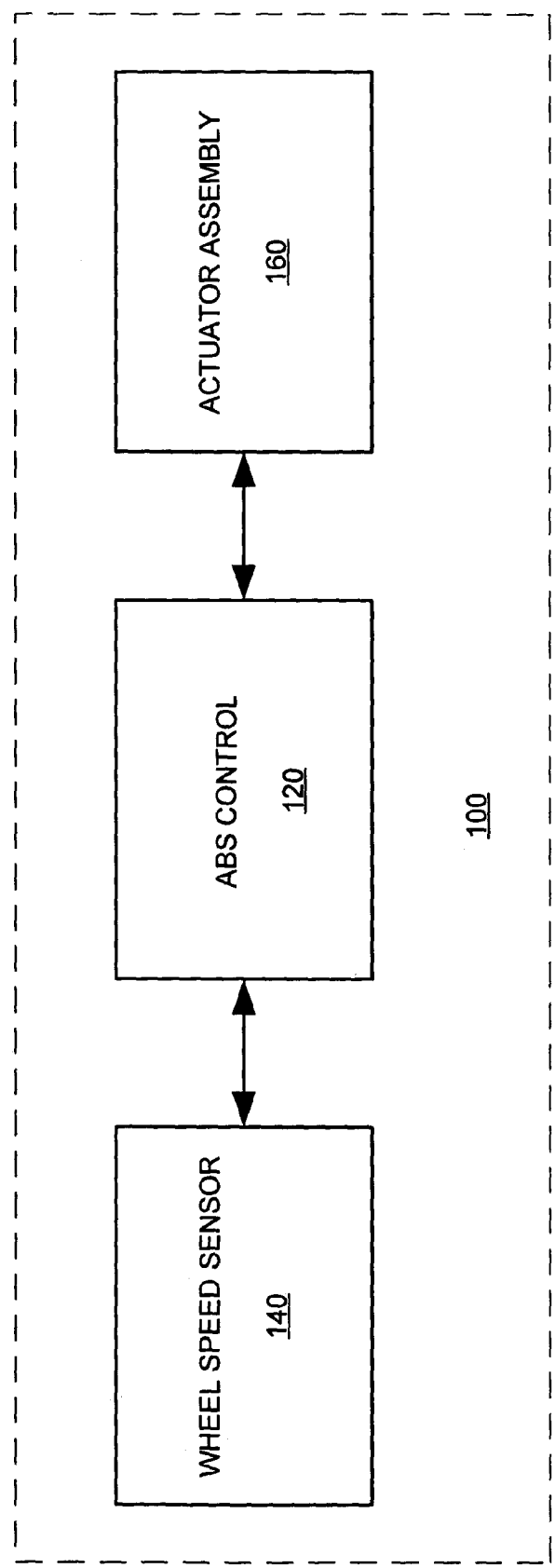
FIG. 1 is a block diagram of a vehicle anti-lock brake system to which the method of the invention may be applied.

FIG. 1 is a block diagram of a vehicle anti-lock brake system to which the method of the invention may be applied. FIG. 1 shows a vehicle brake control system 100 comprising an ABS control 120, a wheel speed sensor 140, and a brake actuator assembly 160. In FIG. 1, the ABS controller 120 is shown coupled to the wheel speed sensor 140. The ABS controller 120 is also shown coupled to the brake actuator assembly 160.

The ABS control 120 is any controller capable of operating an anti-lock brake system. Generally, the ABS control 120 is a processor or microcontroller capable of processing data, executing instructions, generating commands and communication with external devices. The ABS control 120 may be integrated with other devices as will be discussed in detail with reference to FIG. 2. In one embodiment, ABS control 120 is a software module operating on a host processor (not shown.) In another embodiment, the ABS control 120 is a programmable multimode controller capable of reconfigurable operation based on real-time data input. Multimode operation will be discussed in detail with reference to FIG. 3. Generally, the ABS control 120 is enabled to determine various failure conditions in an actuator assembly or a wheel speed indicator. Other examples of devices usable for ABS control 120 will be known to skilled practitioners and will not be discussed.

The wheel speed sensor 140 is any sensor capable of providing wheel speed data. Typically, the wheel speed sensor 140 is an electromechanical type sensor device that is capable of communication with other devices. In another embodiment the wheel speed sensor 140 is an optical device having integrated processing and input/output functionality. In operation, the wheel speed sensor 140 communicates status data and wheel speed data to the ABS control 120. The wheel speed sensor 140 may also be enabled to receive control commands from the ABS control 120. Various wheel speed sensor technologies will be familiar to those skilled in the art, and may be used interchangeably with the method of the invention.

The brake actuator assembly 160 is any brake actuator device capable of communication with external devices, processing data, executing instructions, generating commands and applying a braking force based on a generated command. Typically, the brake actuator assembly 160 comprises an electro-hydraulic or electromechanical actuator device for applying a braking force responsive to a command combined with an actuator controller comprising a processor or microcontroller capable of processing data, executing instructions, generating commands and communication with external devices. In one embodiment, the brake actuator assembly 160 includes a motor-driven actuator enabled to respond to commands from a separate controller such as ABS control 120. The brake actuator assembly 160 is generally configured to receive brake control commands from the ABS control 120, but may also be configured to communicate status information or other data. Typically, the brake actuator assembly 160 provides varying levels of constant or modulated braking force based on received control commands.

Figure 2:
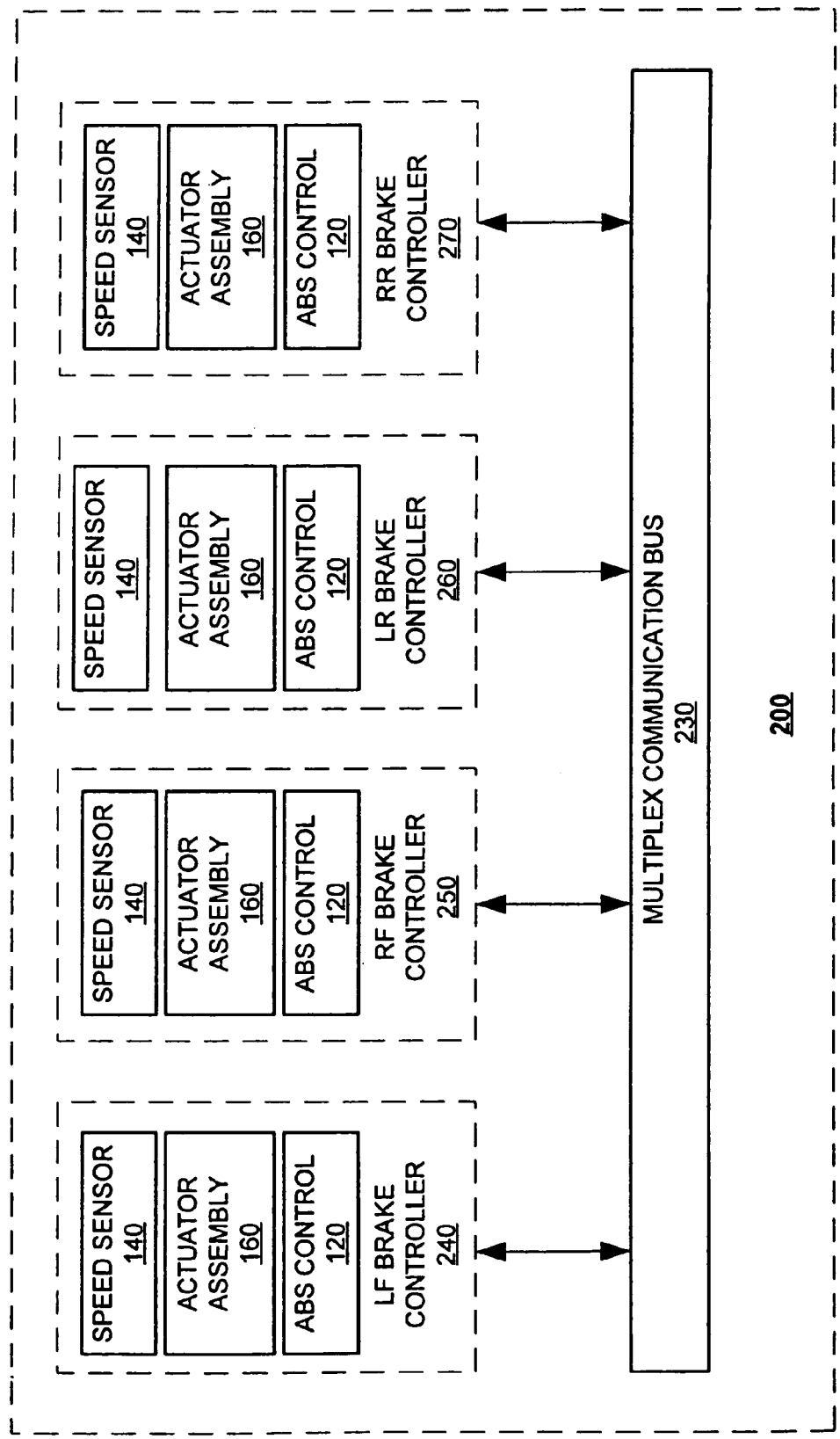
FIG. 2 is a block diagram of a decentralized vehicle brake-by-wire system including an ABS control to which the method of the invention may be applied.

FIG. 2 is a block diagram of a decentralized vehicle brake-by-wire system including an ABS control to which the method of the invention may be applied. FIG. 2 shows a decentralized ABS enabled brake-by-wire system 200 (hereinafter, "brake system") comprising a multiplex communication bus 230, and four vehicle brake system controllers representing left front (LF) 240, right front (RF) 250, left rear (LR) 260, and right rear (RR) 270. The brake system controllers 240, 250, 260 and 270, are each shown comprising a wheel speed sensor 140, a brake actuator assembly 160, and an ABS control 120. The multiplex communication bus 230 is shown coupled to each of the brake system controllers 240, 250, 260 and 270. While the depicted embodiment illustrates a vehicle having a brake system controller for each of four vehicle wheels, other physical embodiments for application with the method of the invention are possible including vehicles having fewer than four wheels and vehicles having greater than four wheels.

In operation, the brake system 200 incorporates a multiplex communication bus 230. The multiplex communication bus is a bi-directional data bus configured to allow multiple connected devices to exchange data. Devices coupled to the multiplex communication bus 230 typically have unique addresses that allow them to be identified and accessed by other devices. Methods and systems for implementing a multiplex communication bus 230 will be known by those skilled in the art, and will not be further elaborated. Typically, the multiplex communication bus 230 is enabled to communicate with each component of the brake controllers 240, 250, 260 and 270.

In operation, data from each brake controller 240, 250, 260 and 270 may be communicated through the multiplex communication bus 230 to each ABS control 120. Generally, each control module of a brake controller is enabled to provide data to any other module, and additional vehicle data from other vehicle systems may be available to the brake controller through the multiplex communication bus 230. Other types of vehicle data include: positional data, acceleration and velocity data, engine speed and suspension data, steering data, yaw and roll data, and the like. In one embodiment, the multiplex communication bus is implemented as a dual bus redundant system for additional system reliability.

Generally, in a brake-by-wire system the various braking control functions are implemented using software modules. In one embodiment, all braking function is controlled by the ABS control 120, and a base brake command applies when the system is not in ABS mode. A base braking command in a brake-by-wire system is equivalent to normal braking function in a conventional hydraulic-boost brake system. Other details of decentralized brake-by-wire systems are known in the art, and will be familiar to the skilled practitioner and will not be further discussed.

Figure 3:
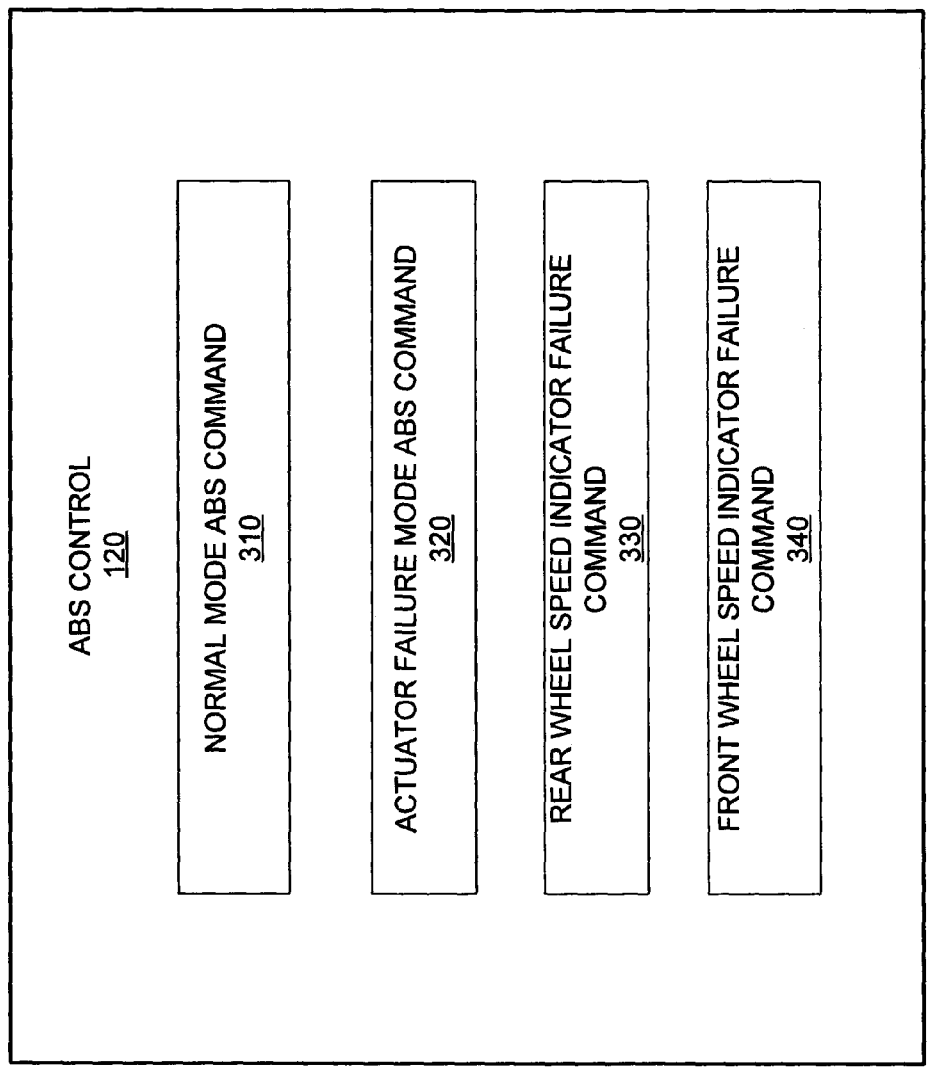
FIG. 3 is a block diagram illustrating an ABS control as in FIGS. 1–2 having multiple mode commands to which the method of the invention may be applied.

FIG. 3 is a block diagram illustrating an ABS control as in FIGS. 1–2 having multiple mode commands to which the method of the invention may be applied. FIG. 3 shows an ABS control module 120 encompassing a normal-mode ABS command 310, an actuator failure mode ABS command 320, a rear wheel speed indicator failure command 330, and a front wheel speed indicator failure command 340. Each command represents a command set for specific ABS operating modes for the ABS as described in FIGS. 1 and 2.

The normal mode command 310 represents a command set including operation of an actuator assembly 160 where no ABS failures or errors are detected. Therefore, a normal mode ABS command 310 may include commands for variable force application for each actuator assembly 160 implemented in real-time. The normal mode command set is the default ABS command set.

The actuator failure mode ABS command 320 represents a command set including operation of an actuator assembly 160 when an ABS error is detected, such as a brake actuator failure, for example. An actuator failure condition operating mode is determined by implementing the failure mode command set. The failure mode command set generally includes commands calculated in real-time from available data to allow effective operation of the anti-lock brake system excluding one or more of the vehicle wheels.

The rear wheel speed indicator failure command 330 is a specific command that is calculated in real-time from available data to allow effective application of braking force for the rear wheel or wheels that have the wheel speed indicator failure. In one embodiment, the rear wheel speed indicator failure command 330 comprises commanding the actuator assembly 160 to apply zero force.

The front wheel speed indicator failure command 340 is a specific command that is calculated in real-time from available data to allow effective application of braking force to the front wheel that has the wheel speed indicator failure. In one embodiment, the front speed indicator failure command 340 comprises commanding the brake actuator 160 to apply the minimum force value of the rear wheel commands.

Figure 4:
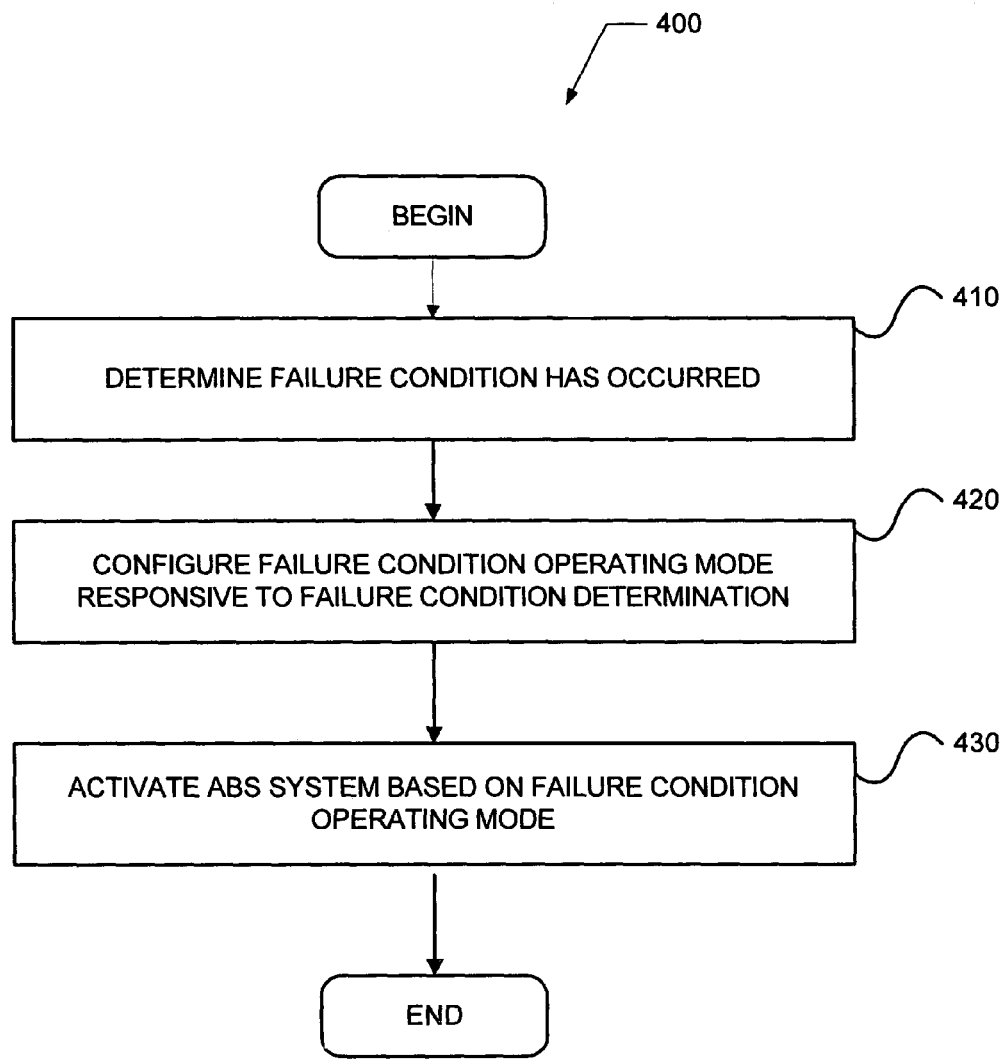
FIG. 4 is a flow diagram of a method for operating an anti-lock brake system in accordance with the invention.

FIG. 4 is a flow diagram of a process for operating an anti-lock brake system in accordance with the invention. Process 400 begins in step 410. In step 410, a determination is made whether a failure condition has occurred. A failure condition is an identified ABS failure, such as a brake actuator failure or a wheel speed signal failure, for example. The failure condition determination is generally implemented by an ABS controller, such as ABS controller 120 of FIGS. 1–3. The failure condition is typically determined by monitoring the status of ABS components such as brake actuators and wheel speed indicators. In one embodiment, the ABS controller 120 as in FIG. 2 is enabled to continuously determine the status of the brake system 200 components to monitor ABS components for a failure condition. The failure condition determination may occur at any time that the ABS has power.

In step 420, a failure condition operating mode is configured responsive to determining a failure condition has occurred in step 410. The failure condition operating mode provides a method of operating the ABS when a failure condition has occurred. In the embodiment of FIG. 2, the brake system 200 is generally configured for operation with fewer than all of the vehicle wheels in response to the failure condition determination. The failure condition operating mode configuration occurs any time after the failure mode determination. Typically, the configuration will occur sequentially after a failure mode determination when one wheel of a vehicle activates an ABS mode. Configuring a failure condition operating mode generally comprises generating an explicit command set as in FIG. 3 for the specific type of failure condition determined in step 410.

In one exemplary embodiment, the failure condition operating mode compensates for an invalid front wheel speed signal failure. In the base braking mode the wheel having the failure is configured to apply a base brake command. If any other wheel triggers ABS then the ABS failure condition operating mode will be configured to apply a level of force to ensure no lock on the failed wheel, and to apply normal mode ABS on the remaining wheels.

In another exemplary embodiment, the failure condition operating mode compensates for an inoperable front brake actuator. The inoperable actuator prevents base braking for the failed wheel. The remaining wheels are configured to operate with normal base braking and ABS commands. If the wheel speed data is available for the wheel with the failed brake actuator, it will be used for vehicle speed processing.

In yet another exemplary embodiment, the failure condition operating mode compensates for an invalid rear wheel speed signal failure. In the base braking mode the vehicle wheel having the failure is configured to apply a base brake command. If any other wheel triggers ABS then the ABS failure condition operating mode will be configured not to apply any force to the failed wheel and to apply normal mode ABS on the front wheels. The remaining rear wheel or wheels will be configured to provide a calculated command based on available vehicle data. In another implementation, a surface coefficient is determined via the front wheels along with a path heading via a steering control and a force command is configured that will apply braking force without lock up.

In a final exemplary embodiment, the failure condition operating mode compensates for an inoperable rear brake actuator. No base braking is available for the failed wheel due to the actuator failure. If any other wheel triggers an ABS mode then the ABS failure condition operating mode will be configured not to apply any force to the failed wheel and to apply normal mode ABS on the front wheels. The remaining rear wheel or wheels will be configured to provide a calculated command based on available vehicle data.

In step 430, an anti-lock brake system is activated based on the failure condition operating mode configured in step 420. The ABS may be activated at any time after the failure condition operating mode is configured in step 420. Generally, activating the ABS comprises executing the brake commands configured in step 420. Typically, the ABS will remain active as long as data indicate wheel slip or another traction event or a lock-up event. The brake system returns to base mode operation when the ABS becomes inactive.

The scope of the invention is indicated in the appended claims. We intend that all changes or modifications within the meaning and range of equivalents are embraced by the claims.

We claim:

1. A method for operating a vehicle anti-lock brake system comprising:
   determining a brake actuator failure at a wheel of a vehicle;
   configuring a failure condition operating mode of the anti-lock brake system responsive to the brake actuator failure condition determination, wherein said configuring comprises configuring an ABS control for operation excluding the wheel having a failed brake actuator; and
   activating the anti-lock brake system based on the failure condition operating mode;
   wherein the failure condition operating mode for a rear wheel brake actuator failure comprises:
   producing a normal-mode ABS command for each front vehicle wheel; and
   producing a failure-mode ABS command for each remaining rear wheel based on vehicle data available to the ABS control.

2. The method of claim 1, further comprising:
   determining if wheel speed data is available for the wheel having the brake actuator failure;
   receiving the wheel speed data responsive to determining the wheel speed is available; and
   utilizing the wheel speed data for calculation of the vehicle speed.

3. A method for operating a vehicle anti-lock brake system comprising:
   determining a failure condition comprising an invalid wheel speed indicator at a wheel of a vehicle;
   configuring a failure condition operating mode of the anti-lock brake system responsive to the failure condition determination, wherein said configuring comprises configuring an ABS control for operation without wheel speed data from the invalid wheel speed indicator; and
   activating the anti-lock brake system based on the failure condition operating mode;
   wherein the failure condition operating mode is configured for a front wheel speed indicator failure comprising:
   producing a normal-mode ABS command for each vehicle wheel except the wheel having a speed indicator failure; and
   producing a front wheel speed indicator failure command for the wheel having the speed indicator failure based on vehicle data available to the ABS control, wherein the front wheel speed indicator failure command comprises a command to apply the minimum of a rear brake command.

4. A computer readable medium storing a computer program comprising:
   computer readable code for determining an ABS failure condition that comprises a brake actuator failure at a wheel of a vehicle;
   computer readable code for configuring a failure condition operating mode of the anti-lock brake system responsive to the failure condition determination that comprises configuring an ABS control for operation excluding the wheel having a failed brake actuator; and
   computer readable code for activating the anti-lock brake system based on the failure condition operating mode
   wherein the failure condition operating mode for a rear wheel brake actuator failure comprises:
   computer readable code for producing a normal-mode ABS command for each front vehicle wheel; and
   computer readable code for producing a failure-mode ABS command for each remaining rear wheel based on vehicle data available to the ABS control.

5. The computer readable medium of claim 4, further comprising:
   computer readable code for determining if wheel speed data is available for the wheel having the brake actuator failure;
   computer readable code for receiving the wheel speed data responsive to determining the wheel speed is available; and
   computer readable code for utilizing the wheel speed to calculate vehicle speed.

6. A computer readable medium storing a computer program comprising:
- computer readable code for determining an ABS failure condition that comprises an invalid wheel speed indicator at a wheel of a vehicle;
- computer readable code for configuring a failure condition operating mode of the anti-lock brake system responsive to the failure condition determination that comprises configuring an ABS control for operation without wheel speed data from the invalid wheel speed indicator; and
- computer readable code for activating the anti-lock brake system based on the failure condition operating mode wherein the failure condition operating mode is configured for a front wheel speed indicator failure comprising:
- computer readable code for producing a normal-mode ABS command for each vehicle wheel except the wheel having a speed indicator failure; and
- computer readable code for producing a front wheel speed indicator failure command for the wheel having the speed indicator failure based on vehicle data available to the ABS control, wherein the front wheel speed indicator failure command comprises a command to apply the minimum of a rear brake command.

7. The computer readable code of claim 6, wherein the failure condition operating mode is configured for a front wheel actuator failure comprising:
- computer readable code for producing a normal-mode ABS command for each remaining vehicle wheel.

* * * * *